United States Patent
Li et al.

(10) Patent No.: US 9,716,373 B2
(45) Date of Patent: Jul. 25, 2017

(54) METHOD OF MOUNTING COLD SHRINKABLE TERMINATION ON ELECTRIC POWER CABLE AND COLD SHRINKABLE TERMINATION ASSEMBLY

(71) Applicant: Tyco Electronics (Shanghai) Co., Ltd., Shanghai (CN)

(72) Inventors: Yugang Li, Shanghai (CN); Haowei Yang, Shanghai (CN); Peng Li, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 62 days.

(21) Appl. No.: 14/576,799

(22) Filed: Dec. 19, 2014

(65) Prior Publication Data
US 2015/0179314 A1 Jun. 25, 2015

(30) Foreign Application Priority Data
Dec. 19, 2013 (CN) .......................... 2013 1 0703037

(51) Int. Cl.
| | | |
|---|---|---|
| *H02G 15/08* | (2006.01) | |
| *H02G 1/14* | (2006.01) | |
| *H01B 3/20* | (2006.01) | |
| *H02G 15/04* | (2006.01) | |
| *H02G 15/068* | (2006.01) | |
| *H02G 15/18* | (2006.01) | |

(52) U.S. Cl.
CPC ................. *H02G 1/14* (2013.01); *H01B 3/20* (2013.01); *H02G 15/046* (2013.01); *H02G 15/068* (2013.01); *H02G 15/1833* (2013.01); *Y10T 29/49178* (2015.01)

(58) Field of Classification Search
USPC ...................... 174/74 R, 77 R, 79, 84 R, 88 S
See application file for complete search history.

(56) References Cited

U.S. PATENT DOCUMENTS

| | | | | |
|---|---|---|---|---|
| 4,757,159 A | * | 7/1988 | Dejean ................. | H02G 15/068 174/73.1 |
| 4,868,967 A | * | 9/1989 | Holt ......................... | F16L 5/02 174/135 |
| 5,008,317 A | * | 4/1991 | Wolfer ..................... | C08K 3/22 524/262 |

(Continued)

FOREIGN PATENT DOCUMENTS

WO   WO 2011/090643 A3 * 11/2011 ............ C09J 183/04

*Primary Examiner* — William H Mayo, III
(74) *Attorney, Agent, or Firm* — Barley Snyder

(57) ABSTRACT

An inventive method of mounting a cold shrinkable termination on an electric power cable has the steps of: providing a support tube having an outer surface coated with a soft material comprising a gel or a sealing compound on a predetermined segment; pre-expanding an insulation body of a cold shrinkable termination on the support tube coated with the soft material; inserting a cable joint of the electric power cable having a portion of a conductive shielding layer and a portion of an inner insulation layer removed, into the support tube; and removing the support tube from the cold shrinkable termination such that the cold shrinkable termination shrinks on the cable joint of the electric power cable, and the soft material is positioned between the cold shrinkable termination and the cable joint.

25 Claims, 2 Drawing Sheets

(56) References Cited

U.S. PATENT DOCUMENTS

| | | | | |
|---|---|---|---|---|
| 5,070,597 | A * | 12/1991 | Holt | F16L 5/02 138/103 |
| 5,280,136 | A * | 1/1994 | Yaworski | H02G 15/068 174/73.1 |
| 5,665,809 | A * | 9/1997 | Wojtowicz | C08J 3/247 264/178 R |
| 5,735,981 | A * | 4/1998 | Winfield | H02G 1/14 156/229 |
| 5,753,861 | A * | 5/1998 | Hansen | H01R 4/70 174/136 |
| 5,804,767 | A * | 9/1998 | Winfield | H02G 15/013 174/74 R |
| 5,844,170 | A * | 12/1998 | Chor | H02G 15/068 174/74 A |
| 5,952,612 | A * | 9/1999 | Winfield | H02G 15/013 174/74 R |
| 6,111,200 | A * | 8/2000 | De Schrijver | B29C 61/065 174/74 A |
| 6,342,679 | B1 * | 1/2002 | Portas | B29C 69/001 174/178 |
| 6,387,518 | B1 * | 5/2002 | Wolfer | C08K 3/22 106/18.12 |
| 6,472,600 | B1 * | 10/2002 | Osmani | H02G 15/1826 174/75 R |
| 7,511,222 | B2 * | 3/2009 | Taylor | H02G 15/1826 174/84 R |
| 7,642,460 | B2 * | 1/2010 | Bandyopadhyay | B29C 61/065 174/93 |
| 7,705,085 | B2 * | 4/2010 | Bandyopadhyay | C08K 5/14 174/93 |
| 7,901,243 | B1 * | 3/2011 | Yaworski | H01R 4/34 439/523 |
| 8,119,193 | B2 * | 2/2012 | Vallauri | H02G 15/1826 29/235 |
| 2001/0011599 | A1 * | 8/2001 | De Buyst | H02G 15/182 174/74 R |
| 2004/0099434 | A1 * | 5/2004 | Balconi | H02G 15/103 174/88 R |
| 2004/0262025 | A1 * | 12/2004 | Brandt | H02G 15/115 174/88 R |
| 2006/0213678 | A1 * | 9/2006 | Kamel | H02G 15/1833 174/73.1 |
| 2006/0272842 | A1 * | 12/2006 | Vallauri | H02G 1/14 174/73.1 |
| 2007/0256852 | A1 * | 11/2007 | Cardinaels | H02G 15/1826 174/74 A |
| 2008/0041605 | A1 * | 2/2008 | Wentzel | H02G 15/02 174/36 |
| 2008/0045648 | A1 * | 2/2008 | Bayon | C08L 83/04 524/588 |
| 2008/0156528 | A1 * | 7/2008 | Campbell | H02G 15/1826 174/84 R |
| 2009/0042043 | A1 * | 2/2009 | Joseph | C09D 183/04 428/447 |
| 2009/0218135 | A1 * | 9/2009 | Vallauri | H02G 15/1826 174/88 C |
| 2010/0132976 | A1 * | 6/2010 | Tognali | H02G 15/10 174/113 R |
| 2010/0279542 | A1 * | 11/2010 | Seraj | H01R 4/72 439/502 |
| 2014/0076627 | A1 * | 3/2014 | Maher | H02G 15/064 174/77 R |

* cited by examiner

1

METHOD OF MOUNTING COLD SHRINKABLE TERMINATION ON ELECTRIC POWER CABLE AND COLD SHRINKABLE TERMINATION ASSEMBLY

CROSS-REFERENCE TO RELATED APPLICATION

This application claims the benefit of the filing date under 35 U.S.C. §119(a)-(d) of Chinese Patent Application No. 201310703037.6, filed on Dec. 19, 2013.

FIELD OF THE INVENTION

The present invention generally relates to a method of mounting a cold shrinkable termination on an electric power cable and more specifically, to a cold shrinkable termination assembly.

BACKGROUND

FIG. 1 shows a conventional pre-expanded, cold shrinkable termination to be mounted on an electric power cable. As shown in FIG. 1, the conventional cold shrinkable termination mainly comprises an insulation body 1, a stress control cone 2 and a terminating end connection member 3.

The terminating end connection member 3 is sealed on a first end 4 of the insulation body 1, and the stress control cone 2 is positioned inside the insulation body 1 at a location adjacent to a second end of the insulation body 1. The electric power cable generally comprises a conductor core, an inner insulation layer covering the conductor core, a conductive shielding layer covering the inner insulation layer, and a outer sheath covering the conductive shielding layer. Thereby, before mounting the cold shrinkable termination on the electric power cable, a segment of outer sheath of the electric power cable must be firstly removed to expose a segment of conductive shielding layer, and then a segment of the exposed conductive shielding layer is removed to expose a segment of inner insulation layer, and then a segment of the exposed inner insulation layer is removed to expose a segment of conductor core. As a result, a cable joint is formed on the electric power cable. Thereafter, a layer of grease is coated on the exposed inner insulation layer of the cable joint, then the cold shrinkable termination is mounted on the cable joint coated with the layer of grease, so that the grease is filled in a gap between the cable joint and the insulation body of the cold shrinkable termination to effectively prevent electric field concentration and electric breakdown at the cable joint of the electric power cable.

However, if installation condition is very poor on field site, for example, in a tunnel, high altitude in air, etc., it becomes very difficult or even impossible to coat the grease on the cable joint of the electric power cable. As a result, mounting the cold shrinkable termination on the cable joint on field site becomes a time-consuming and laborious task for an operator. Furthermore, the installation effect is undesired.

SUMMARY

A method of mounting a cold shrinkable termination on an electric power cable is disclosed having the steps of providing a support tube having an outer surface coated with a soft material comprising a gel or a sealing compound on a predetermined segment; pre-expanding an insulation body of a cold shrinkable termination on the support tube coated with the soft material; inserting a cable joint of the electric power cable having a portion of a conductive shielding layer and a portion of an inner insulation layer removed, into the support tube; and removing the support tube from the cold shrinkable termination such that the cold shrinkable termination shrinks on the cable joint of the electric power cable, and the soft material is positioned between the cold shrinkable termination and the cable joint.

BRIEF DESCRIPTION OF THE DRAWINGS

The invention will now be described by way of example, with reference to the accompanying Figures, of which.

DETAILED DESCRIPTION OF THE EMBODIMENT(S)

Figure 1:
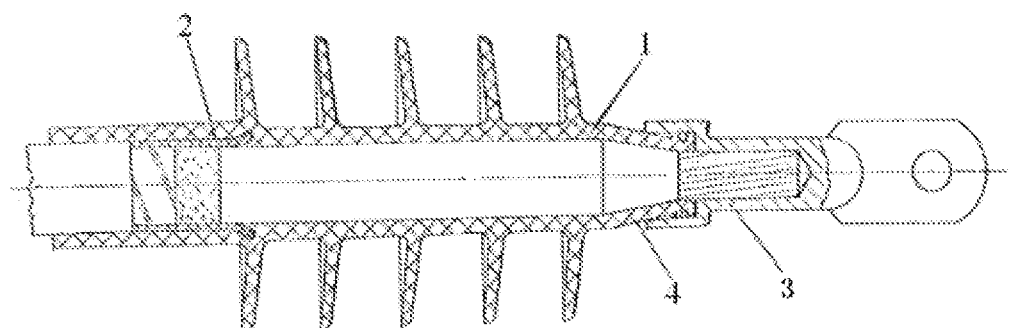
FIG. 1 is an axial cross-section view of a conventional pre-expanded, cold shrinkable termination.

Embodiments of the present invention will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
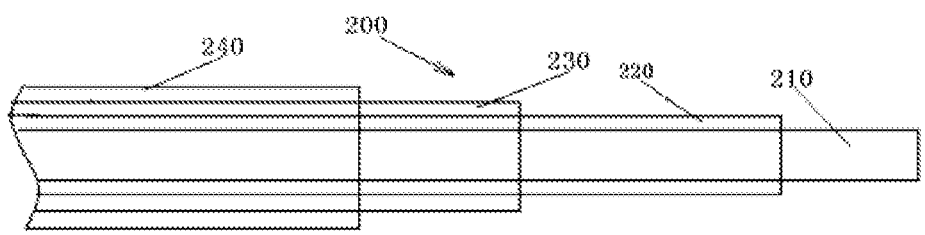
FIG. 2 is a plan view of a cable joint of an electric power cable.

According to a general concept of the present invention, there is provided a method of mounting a cold shrinkable termination on an electric power cable. As shown in the embodiment of FIG. 2, an electric power cable 200 has a conductor core 210, an inner insulation layer 220 covering the conductor core 210, a conductive shielding layer 230 covering the inner insulation layer 220, and an outer sheath 240 covering the conductive shielding layer 230. Thereby, before mounting a cold shrinkable termination on the electric power cable 200, a segment of the outer sheath 240 along an end of the cable 200 must be firstly removed to expose a segment of the conductive shielding layer 230. Then a segment of the exposed conductive shielding layer 230 is removed to expose a segment of inner insulation layer 220. Next, a segment of the exposed inner insulation layer 220 is removed to expose a segment of conductor core 210. As a result, a cable joint to be connected is formed on the electric power cable 200.

In an embodiment, the electric power cable 200 is used to transmit a voltage below 110 kV. In other embodiments, the electric power cable is used to transmit a voltage of 35 kV, 10 kV or other voltage value.

Figure 3:
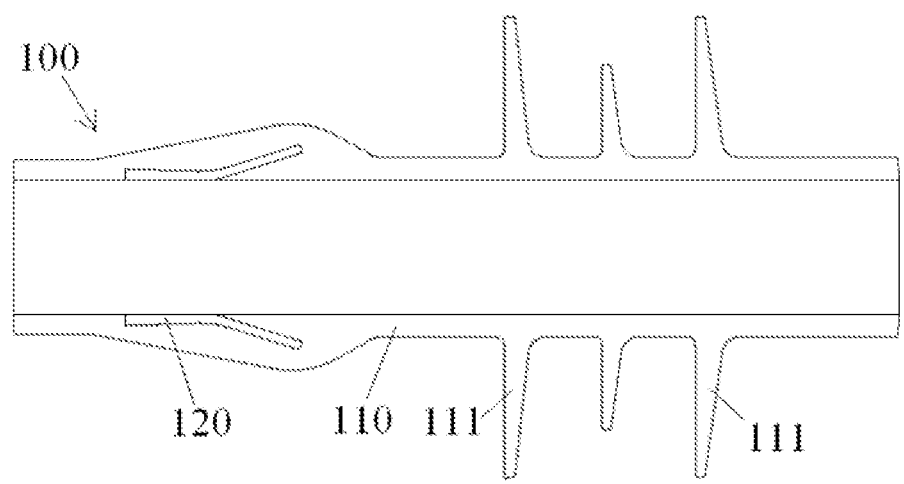
FIG. 3 is a perspective view of a cold shrinkable termination.

As shown in the embodiment of FIG. 3, the cold shrinkable termination 100 includes a cylindrical insulation body 110. A stress control cone 120 is positioned inside the insulation body 110 to prevent electric field concentration and electric breakdown at the cable joint 200 of the electric power cable.

In an embodiment, the stress control cone 120 is integrally formed with the insulation body 110. In an embodiment, the stress control cone 120 is made of a semi-conductive silicone rubber, and the insulation body 110 is made of an insulation silicone rubber. In this way, the insulation body 110 and the stress control cone 120 are molded as a single piece.

In an embodiment, a plurality of umbrella-shaped ribs 111 are formed on an outer wall of the insulation body 110 so as to increase the creepage distance of the cold shrinkable termination 100.

Figure 4:
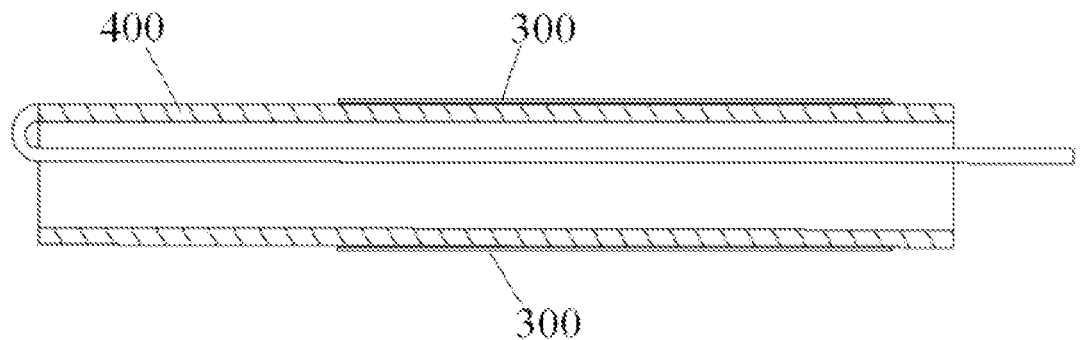
FIG. 4 is a perspective view of a support tube pre-coated with a layer of soft material.

As shown in the embodiment of FIG. 4, a layer of soft material 300 is coated on a predetermined segment of an outer wall of the support tube 400 corresponding to the cable joint 200. The thickness of the coated soft material 300 is variable, depending on a size of the cable joint.

In an embodiment, the soft material 300 is a viscous liquid gel with a certain viscosity before being cross-linked, and the gel is cross-linked after a predetermined time after being coated on the support tube 400. In another embodiment, the soft material is a silicone oil mixed with a catalyst and a cross-linking agent. The silicone oil will be cross-linked at room temperature to become a gel after being applied to the outer surface of the support tube 400.

In an embodiment, the viscous liquid gel comprises a vinyl double-end terminated silicone oil, a side chain hydrogen-containing silicone oil, and a platinum-vinyl siloxane complexes, such as a Karsted catalyst.

In an embodiment, the gel is preformed to a gel sheet or a gel tape, and the gel sheet or the gel tape is wrapped on a segment of the outer surface of the support tube 400.

In an embodiment, where the soft material comprises the gel, the hardness of the gel is measured by an analytical instrument that measures soft material, such as a structure analyzer. In an embodiment, the gel may have a hardness, measured by the structure analyzer, less than or equal to 500 g, preferably in a range of 60 to 150 g. In an embodiment, the gel 3 coated on the support tube 400 may have a thickness less than 3 mm. In an embodiment, the thickness of the gel 3 when coated on the support tube 400 has a range of 0.5 to 1.5 mm. In an embodiment where the soft material is the sealing compound, such as paste, the sealing compound may have plasticity number, measured at 70° C. according to a standard of GB/T 12828-2006, less than 500, in step S100.

The standard of GB/T 12828-2006 means 'Rubber, raw and un-vulcanized compounded—determination of plasticity number and recovery number—parallel plate method', published on Dec. 29, 2006 and implemented on Jun. 1, 2007 by General Administration of Quality Supervision, Inspection and Quarantine of the People's Republic of China (AQSIQ) and Standardization Administration of the People's Republic of China (SAC).

The hardness of the gel is measured by the structure analyzer or the like. The structure analyzer may comprise Voland-Stevens Texture Analyzer having a five thousand gram load cell for measuring force, a five gram trigger, and a ¼" (6.35 mm) of stainless steel test head (ball probe). During measuring the Voland hardness of the gel, the test head is pressed into the gel at a speed of 0.2 mm/s until reaching a depth of 4.0 mm, and a force on the test head indicated by a unit of gram is recorded by a computer, and the Voland hardness of the gel is represented by the force. That is, the Voland hardness of the gel is represented by a force necessary to press the test head into the surface of the gel at the speed of 0.2 mm/s or to deform the surface of the gel by 4.0 mm, where the higher the value of the measured force, the harder the gel.

In an embodiment, the viscous liquid gel contains 100 parts by weight of the vinyl double-end terminated silicone oil having a viscosity of 100 Pa·s; 1.88 parts by weight of the side chain hydrogen-containing silicone oil containing 0.11% by weight of side chain hydrogen, and 20 ppm parts by weight of the platinum-vinyl siloxane complexes.

In another embodiment, the viscous liquid gel contains 100 parts by weight of the vinyl double-end terminated silicone oil having a viscosity of 100 Pa·s, 1.06 parts by weight of the side chain hydrogen-containing silicone oil containing 0.2% by weight of side chain hydrogen, and 20 ppm parts by weight of the platinum-vinyl siloxane complexes.

In another embodiment, the viscous liquid gel contains 50 parts by weight of the vinyl double-end terminated silicone oil having a viscosity of 100 Pa·s, 50 parts by weight of the vinyl double-end terminated silicone oil having a viscosity of 10 Pa·s, 3 parts by weight of the side chain hydrogen-containing silicone oil containing 0.11% by weight of side chain hydrogen, and 20 ppm parts by weight of the platinum-vinyl siloxane complexes.

In yet another embodiment, the viscous liquid gel contains 100 parts by weight of the vinyl double-end terminated silicone oil having a viscosity of 10 Pa·s, 2.2 parts by weight of the side chain hydrogen—containing silicone oil containing 0.11% by weight of side chain hydrogen, and 20 ppm parts by weight of the platinum-vinyl siloxane complexes.

Figure 5:
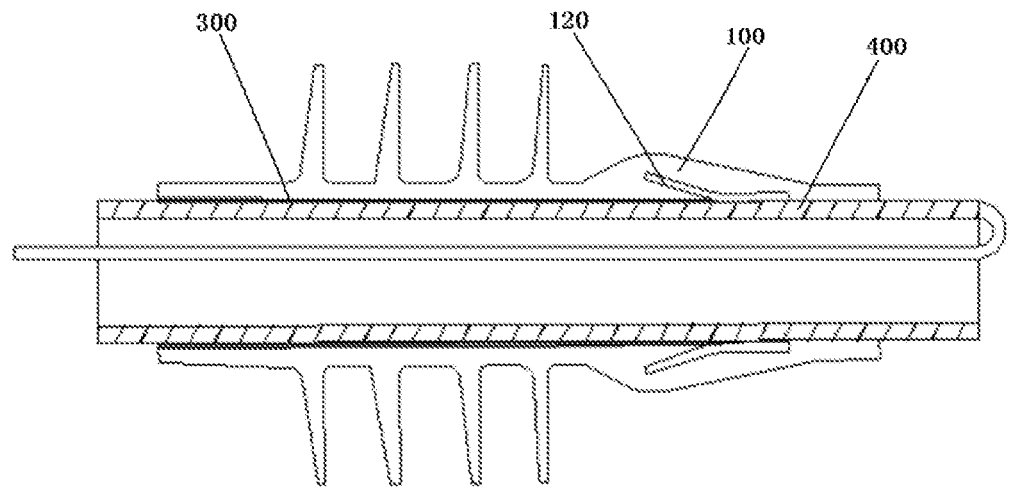
FIG. 5 is a cross-sectional view of a cold shrinkable termination assembly having a pre-expanded insulation body of the cold shrinkable termination of FIG. 3, positioned on the support tube pre-coated with a layer of soft material shown in FIG. 4.

As shown in an embodiment of FIG. 5, the cold shrinkable termination assembly comprises: the support tube 400, the soft material 300 positioned on a predetermined segment of the outer wall of the support tube 400 and comprising the gel or the sealing compound; a cold shrinkable termination 100, and an insulation body 110 of which is pre-expanded on the support tube 400 coated with the soft material 300.

In an embodiment, during manufacturing the cold shrinkable termination 100 is pre-expanded on the support tube 400 coated with the layer of soft material 300, so as to obtain the cold shrinkable termination assembly. The position of the cold shrinkable termination 100 relative to the soft material 300 is fixed during expanding the cold shrinkable termination 100. During the mounting of the cold shrinkable termination 100 on the cable joint 200 of the electric power cable, the operator may directly insert the cable joint 200 of the electric power cable into the support tube 400 and pull out the support tube 400 from the cold shrinkable termination 100. In this way, the cold shrinkable termination 100 can be rapidly and easily mounted on the cable joint 200 of the electric power cable, without a need of coating a layer of gel or grease on the cable joint on field site. The mounting process on site is thus greatly simplified, increasing the mounting efficiency of the cold shrinkable termination, achieving the rapid and simple installation of the cold shrinkable termination, and improving the electric property of the cold shrinkable termination.

Compared with a cold shrinkable termination assembly in the prior art where grease with a certain viscosity is pre-coated, the disclosed cold shrinkable termination assembly has longer service life and higher reliability because the gel or the sealing compound has a long storage period.

In an embodiment, the gel also acts as a sealing agent for sealing an interface between the cold shrinkable termination and a metal connection termination (described below), so as to prevent moisture from entering into the cold shrinkable termination. Thereby, during assembling the cold shrinkable termination assembly, the operator does not need to provide an additional sealing agent between the cold shrinkable termination and the metal connection termination, simplifying the assembling process.

After inserting the cable joint 200 into the support tube 400 of the cold shrinkable termination assembly and pulling out the support tube 400 from the cold shrinkable termination 100, the cold shrinkable termination 100 is simply mounted on the cable joint 200.

In an embodiment, after pulling out the support tube 400 from the cold shrinkable termination 100, the soft material 300 is filled between the cold shrinkable termination 100 and the cable joint 200 at any one of following locations of:

(1) a part of the exposed conductive shielding layer 230 and all exposed inner insulation layer 220;

(2) a part of the exposed conductive shielding layer 230, a part of the exposed inner insulation layer 220, and a step formed by an end surface of exposed conductive shielding layer 230; and/or (3) a part of the exposed inner insulation layer 220 adjacent to the conductive shielding layer 230 or all the exposed inner insulation layer 220.

As shown in the embodiment of FIG. 4, the support tube 400 is a substantial cylindrical tube extending along a longitudinal axis. In an embodiment, the support tube 400 is a variable diameter tube having a first section (not shown) with a first outer diameter and a second section (not shown) having a second outer diameter larger than or equal to the first outer diameter.

In an embodiment, the inner insulation layer 220 is made of rubber or cross-linking polyethylene. The conductive shielding layer 230 is a metal conductive shielding layer, such as a copper wire conductive shielding layer, a copper tape conductive shielding layer, or an aluminum armored shielding layer.

Figure 6:
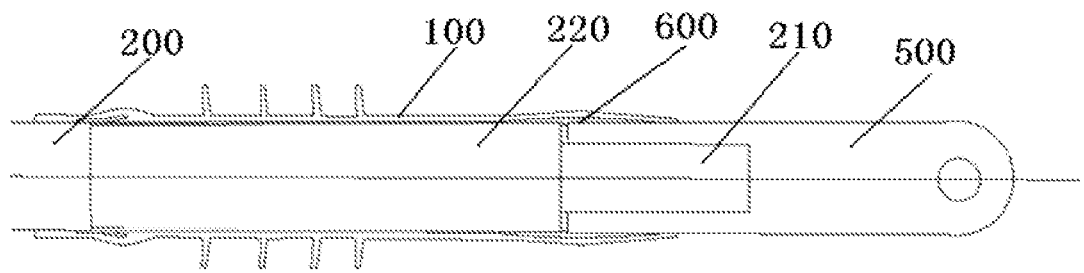
FIG. 6 is a perspective view of the cold shrinkable termination on a cable joint having the cold shrinkable termination assembly of FIG. 5.

As shown in the embodiment of FIG. 6, the cold shrinkable termination 100 may further comprise a metal connection termination 500. An end of the metal connection termination 500 is inserted into the support tube 400 from an end of support tube 400 opposite to the cable joint 200. The metal connection termination 500 is electrically connected to the exposed conductor core 210 of the cable joint of the electric power cable 200. In an embodiment, the metal connection termination 500 is electrically connected to the conductor core 210 of the cable joint 200 by crimping or bolting. When the metal connection termination 500 is connected to the insulation body 110 of the cold shrinkable termination 100, the soft material 300 forms a seal therebetween. After removal of the support tube 400 from the cold shrinkable termination 100, the soft material 300 is coated on at least a portion of the metal connection termination 500.

Hereafter, a method of mounting a cold shrinkable termination 100 on a cable joint 200 of an electric power cable 200 will be described with reference to FIGS. 2-6. An embodiment of the method comprises the following steps of:

S100: providing a support tube 400, and coating soft material 300 comprising a gel or a sealing compound on a predetermined segment of an outer wall of the support tube 400, as shown in the embodiment of FIG. 4;

S200: pre-expanding an insulation body 110 of a cold shrinkable termination 100 on the support tube 400 coated with the soft material 300, as shown in the embodiment of FIG. 5;

S300: inserting a cable joint of the electric power cable 200, of which a part of a conductive shielding layer 230 and a part of an inner insulation layer 220 are removed, into the support tube 400; and S400: pulling out the support tube 400 from the cold shrinkable termination 100, so that the cold shrinkable termination 100 is shrunk on the cable joint of the electric power cable 200 and the soft material 300 is filled between the cold shrinkable termination 100 and the cable joint, thus preventing electric field concentration and electric breakdown at the cable joint 200 of the electric power cable, as shown in the embodiment of FIG. 6.

In an embodiment, in the step S100, the gel is preformed to a gel sheet or a gel tape, and the gel sheet or the gel tape is circumferentially wrapped on a segment of outer wall of the support tube 400.

When the soft material comprises the gel, the hardness of the gel is measured by a measuring instrument adapted to measure soft material, for example, by a structure analyzer. In an example, the gel may have a hardness, measured by the structure analyzer, less than or equal to 500 g, preferably in a range of 60 to 150 g. In an embodiment, the gel has a thickness less than 3 mm. In another embodiment, the gel has a thickness of 0.5 to 1.5 mm. In a condition where the soft material comprises the sealing compound, the sealing compound may have plasticity number, measured at 70° C. according to a standard of GB/T 12828-2006, less than 500.

When the cold shrinkable termination 100 has the metal connection termination 500, between the step S300 and the step S400, the method may further comprise a step of:

S310: providing a metal connection termination 500, an end of which is inserted into the support tube 400 and electrically connected to an exposed conductor core 210 of the cable joint. In an embodiment, the metal connection termination 500 is electrically connected to the conductor core 210 of the cable joint by crimping or bolting, although other connection mechanisms known to those of ordinary skill in the art may also be used.

In an embodiment, after pulling out the support tube 400 from the cold shrinkable termination 100, the soft material 300 is coated on at least a part of the metal connection termination 500, thus sealing the metal connection termination 500 to the insulation body 110 of the cold shrinkable termination 100.

In an embodiment of FIG. 6, a sealing agent 600 is pre-coated on an end of the support tube 400, and the cold shrinkable termination 100 is expanded on the support tube 400 coated with the sealing agent 600. During expanding, the end of the support tube 400 on which the sealing agent 600 is coated should be placed on an end (right end of FIG. 6) of the cold shrinkable termination 100 opposite to the cable joint 200.

After pulling out the support tube 400 from the cold shrinkable termination 100, the insulation body 110 elastically shrinks onto the inner insulation layer 220 of the cable joint 200, and the sealing agent 600, positioned on an inner wall of the upper end of the insulation body 110, is pressed on the inner insulation layer 220 of the cable joint 200 by the insulation body 110. A seal of the end of the cold shrinkable termination 100 to the inner insulation layer 220 of the cable joint 200 is thus formed. In this way, water or moisture can be effectively prevented from being entering into the cold shrinkable termination 100.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A method of mounting a cold shrinkable termination on an electric power cable, comprising steps of:
   providing a support tube having an outer surface coated with a soft material comprising a viscous liquid gel on a predetermined segment, the gel being preformed as a gel sheet or a gel tape and wrapped on the predetermined segment;
   pre-expanding an insulation body of the cold shrinkable termination on the support tube;
   inserting a cable joint of the electric power cable having a portion of a conductive shielding layer and a portion of an inner insulation layer removed, into the support tube; and
   removing the support tube from the cold shrinkable termination such that the cold shrinkable termination shrinks on the cable joint of the electric power cable, and the soft material is positioned between the cold shrinkable termination and the cable joint.

2. The method according to claim 1, wherein the viscous liquid gel comprises a vinyl double-end terminated silicone oil, a side chain hydrogen-containing silicone oil, and a platinum-vinyl siloxane complex.

3. The method according to claim 1, wherein the soft material has a hardness less than or equal to 500 g.

4. The method according to claim 1, wherein the soft material has a hardness of 60 to 150 g.

5. The method according to claim 1, wherein the soft material has a thickness of less than 3 mm.

6. The method according to claim 1, wherein the soft material has a thickness of 0.5 to 1.5 mm.

7. The method according to claim 1, wherein after removing the support tube from the cold shrinkable termination, the soft material is positioned between the cold shrinkable termination and the cable joint at a part of the exposed conductive shielding layer or at any part of the exposed inner insulation layer.

8. The method according to claim 7, wherein a step formed by an end surface of exposed conductive shielding layer.

9. The method according to claim 1, wherein after removing the support tube from the cold shrinkable termination, the soft material is positioned between the cold shrinkable termination and the cable joint at a part of the exposed inner insulation layer adjacent to the conductive shielding layer or at any part of the exposed inner insulation layer.

10. The method according to claim 1, wherein the support tube comprises a straight tube or a variable diameter tube.

11. The method according to claim 1, wherein the inner insulation layer is made of a rubber or a cross-linked polyethylene.

12. The method according to claim 1, further comprising a step of providing a metal connection termination, an end of which is inserted into the support tube and electrically connected to an exposed conductor core of the cable joint prior to removal of the support tube.

13. The method according to claim 12, wherein the metal connection termination is electrically connected to the conductor core of the cable joint by crimping or bolting.

14. The method according to claim 13, wherein the connection of the metal connection termination to the insulation body of the cold shrinkable termination is sealed.

15. The method according to claim 13, wherein after removal of the support tube from the cold shrinkable termination, the soft material is positioned on at least a portion of the metal connection termination.

16. A cold shrinkable termination assembly, comprising:
   a support tube having an outer surface;
   a soft material comprising a viscous liquid gel coated on a predetermined segment of the outer surface, the gel being preformed as a gel sheet or a gel tape and wrapped on the predetermined segment; and
   a cold shrinkable termination having an insulation body pre-expanded on the support tube coated with the soft material.

17. The cold shrinkable termination assembly according to claim 16, wherein the viscous liquid gel comprises a vinyl double-end terminated silicone oil, a side chain hydrogen-containing silicone oil, and a platinum-vinyl siloxane complex.

18. The cold shrinkable termination assembly according to claim 16, wherein the gel has a hardness of less than or equal to 500 g, preferably in a range of 60 to 150 g.

19. The cold shrinkable termination assembly according to claim 16, wherein the gel has a hardness of 60 to 150 g.

20. The cold shrinkable termination assembly according to claim 16, wherein the cold shrinkable termination is mounted on a cable joint of an electric power cable.

21. The cold shrinkable termination assembly according to claim 20, further comprising:
   a metal connection termination, an end of which is inserted into the support tube and electrically connected to an exposed conductor core of the cable joint of the electric power cable.

22. The cold shrinkable termination assembly according to claim 21, wherein after removal of the support tube from the cold shrinkable termination, the soft material is coated on at least a portion of the metal connection termination.

23. The cold shrinkable termination assembly according to claim 16, wherein upon removal of the support tube from the cold shrinkable termination, the soft material is positioned between the cold shrinkable termination and the cable joint at at least one of following locations of:

(1) a part of the exposed conductive shielding layer and all of the exposed inner insulation layer;
(2) a part of the exposed conductive shielding layer, a part of the exposed inner insulation layer, and a step formed by an end surface of exposed conductive shielding layer; or
(3) a part of the exposed inner insulation layer adjacent to the conductive shielding layer or all the exposed inner insulation layer;
or a combination thereof.

24. The cold shrinkable termination assembly according to claim 16, wherein the support tube comprises a straight tube or a variable diameter tube.

25. The cold shrinkable termination assembly according to claim 16, wherein the cold shrinkable termination further comprises a stress control cone integrally formed with the insulation body and positioned therein.

\* \* \* \* \*